United States Patent [19]

Stevens et al.

[11] Patent Number: 5,590,182

[45] Date of Patent: Dec. 31, 1996

[54] SYSTEM FOR INTERCEPTION AND TRANSMISSION OF COMMUNICATION SIGNALS ON TELEPHONE AND DATA LINES

[75] Inventors: Jessica L. Stevens; Bonnie Crystal, both of Foster City, Calif.

[73] Assignee: Telegen Corporation, Foster City, Calif.

[21] Appl. No.: 264,041

[22] Filed: Jun. 22, 1994

[51] Int. Cl.⁶ .................................................. H04M 1/50
[52] U.S. Cl. .................. 379/130; 379/221; 379/199; 379/200; 379/377; 379/386
[58] Field of Search .................... 379/188, 199, 379/200, 194, 160, 161, 130, 131, 132, 184, 413, 221, 377, 386

[56] References Cited

U.S. PATENT DOCUMENTS

| | | | |
|---|---|---|---|
| 4,297,534 | 10/1981 | Epstein et al. | 379/200 |
| 4,578,540 | 3/1986 | Borg et al. | 379/199 X |
| 4,585,904 | 4/1986 | Mincone et al. | 379/131 X |
| 4,661,975 | 4/1987 | Brecher | 379/215 |
| 4,679,001 | 7/1987 | West | 328/167 |
| 4,751,728 | 6/1988 | Treat | 379/140 X |
| 4,893,335 | 1/1990 | Fuller et al. | 379/200 X |
| 4,924,512 | 5/1990 | Sizemore et al. | 379/200 X |
| 4,964,159 | 10/1990 | Son | 379/216 X |
| 4,965,459 | 10/1990 | Murray | 379/200 X |
| 5,200,995 | 4/1993 | Gaukel et al. | 379/180 X |

OTHER PUBLICATIONS

"The California Phone Rush Is On," by Calvin Sims, The New York Times, Aug. 11, 1993.

*Primary Examiner*—Krista M. Zele
*Assistant Examiner*—Daniel S. Hunter
*Attorney, Agent, or Firm*—William J. P. Weiland

[57] ABSTRACT

A control device may be connected in series or in parallel to a telephone for restricting or routing calls made from the telephone to take advantage of low cost carriers for intra-LATA calls. The serial or parallel connection of the telephone can be detected as well. The device may be programmed for routing depending on the geographical location of the telephone. The central receiving office of the local phone company can be prevented from routing the call by the use of interfering tones.

60 Claims, 8 Drawing Sheets

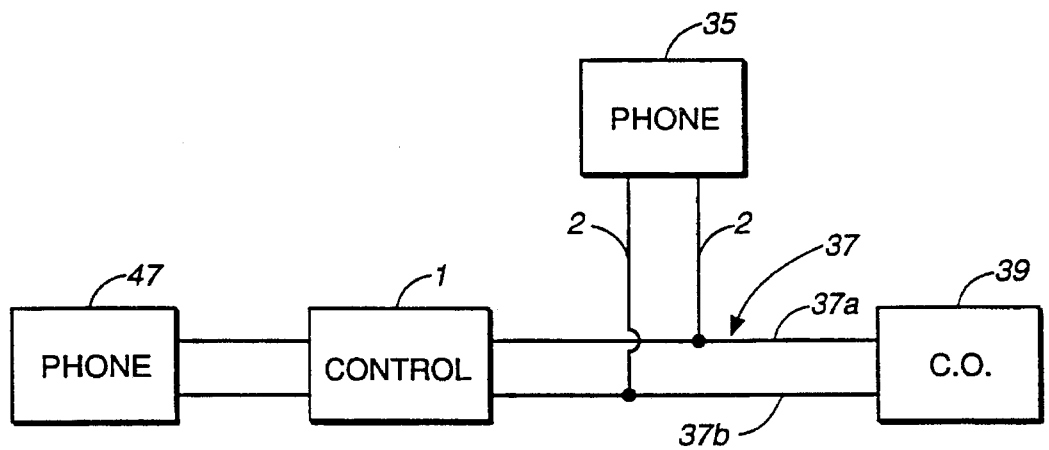
FIG._1
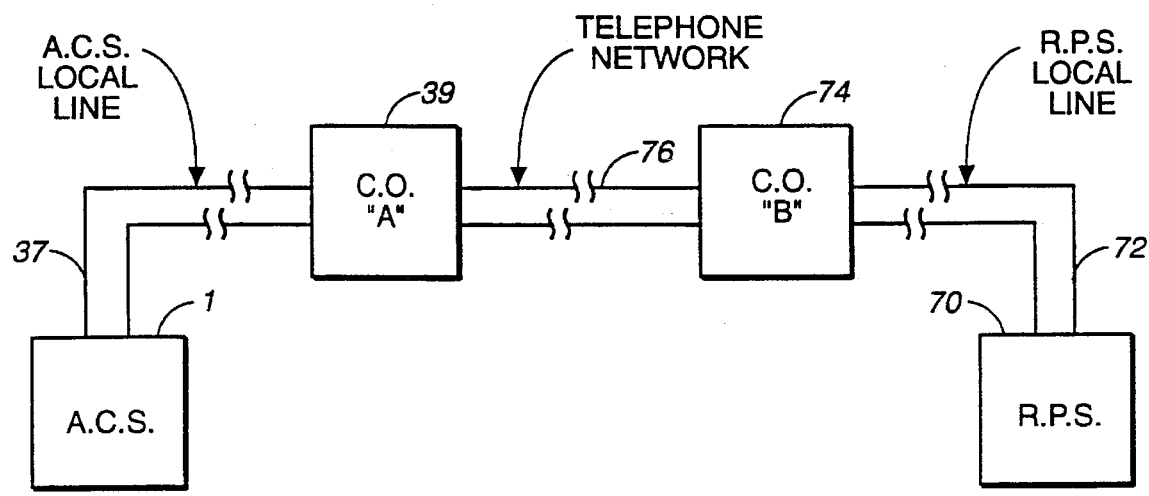
FIG._3

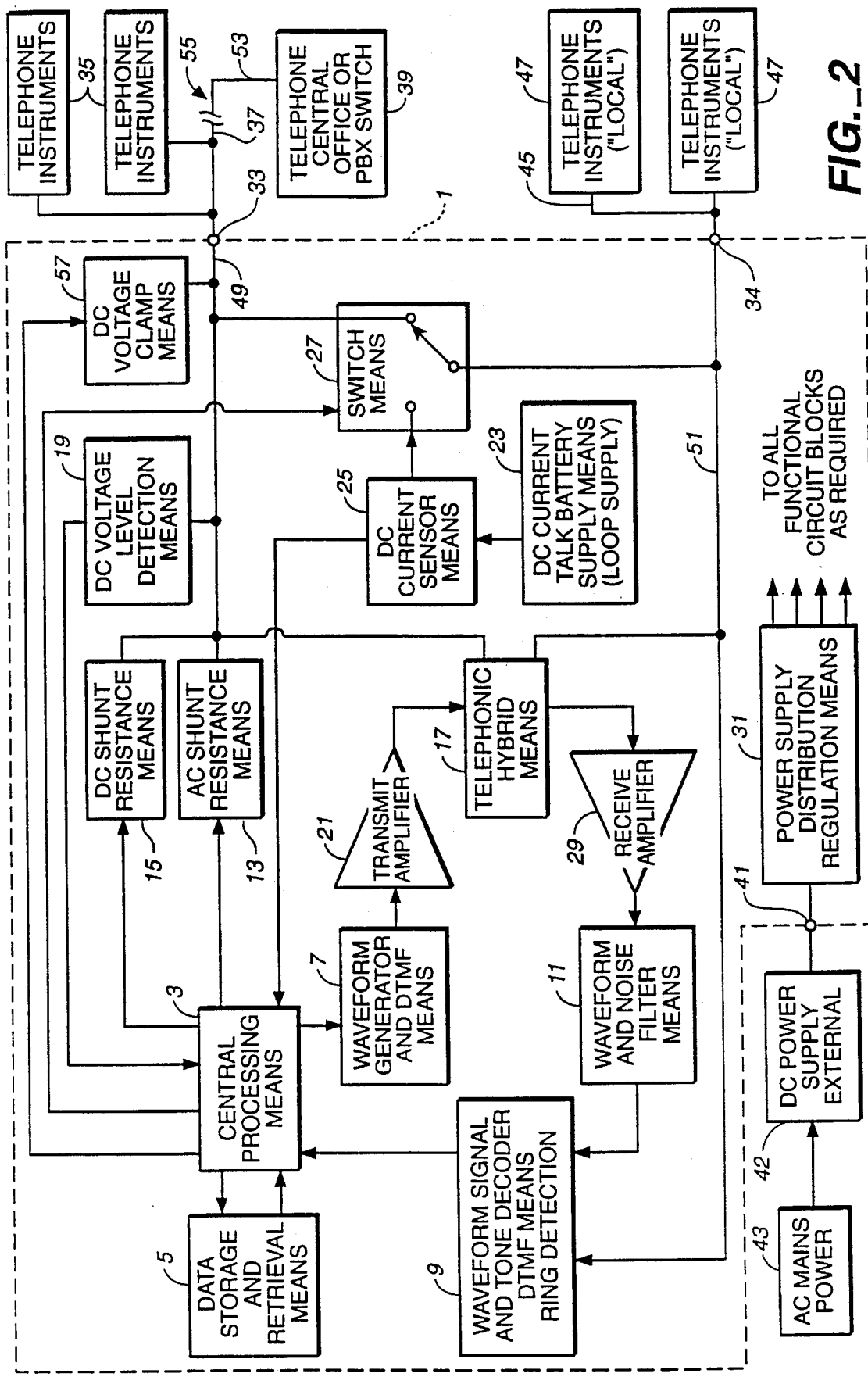
FIG._2

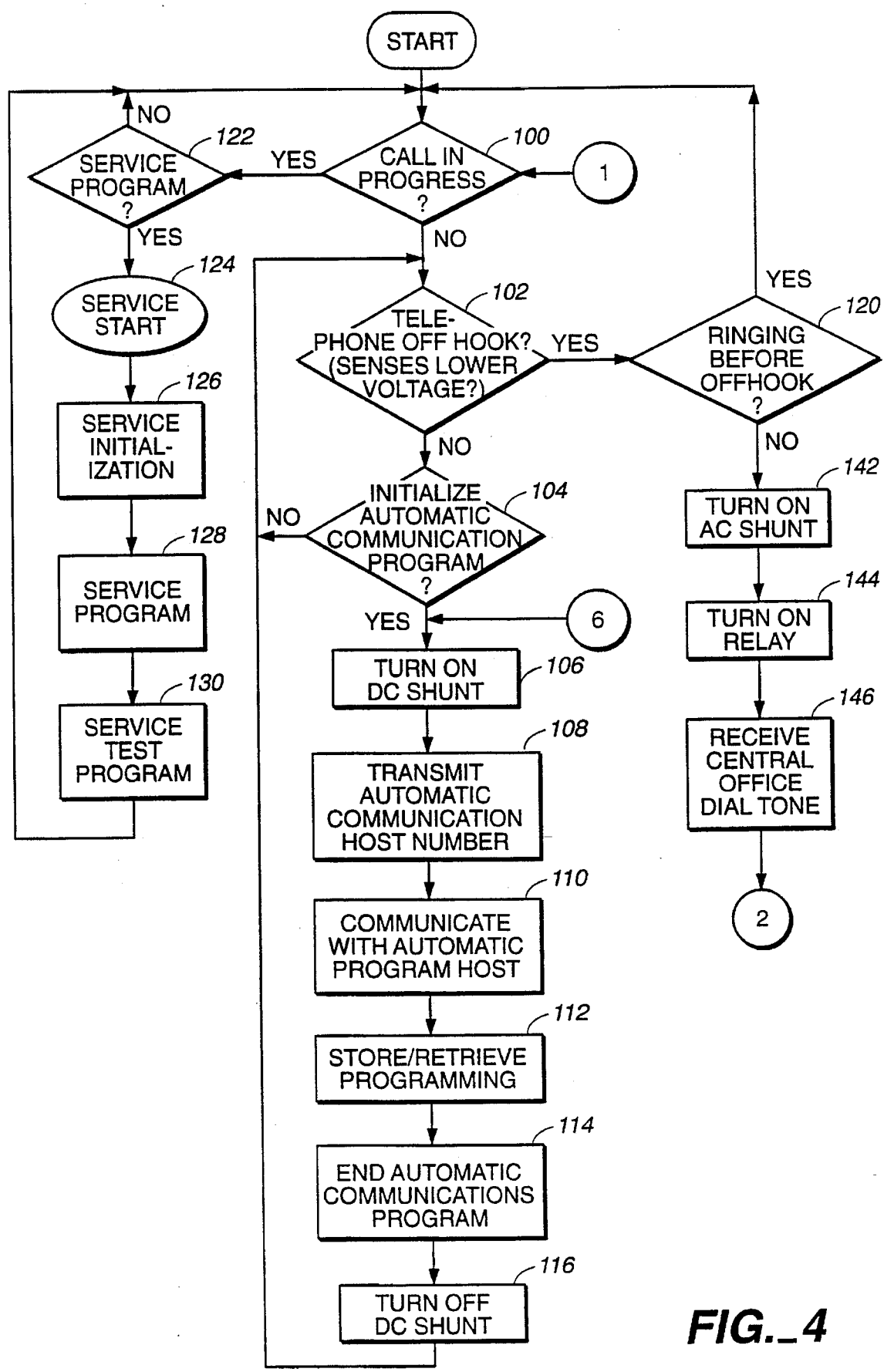
FIG._4

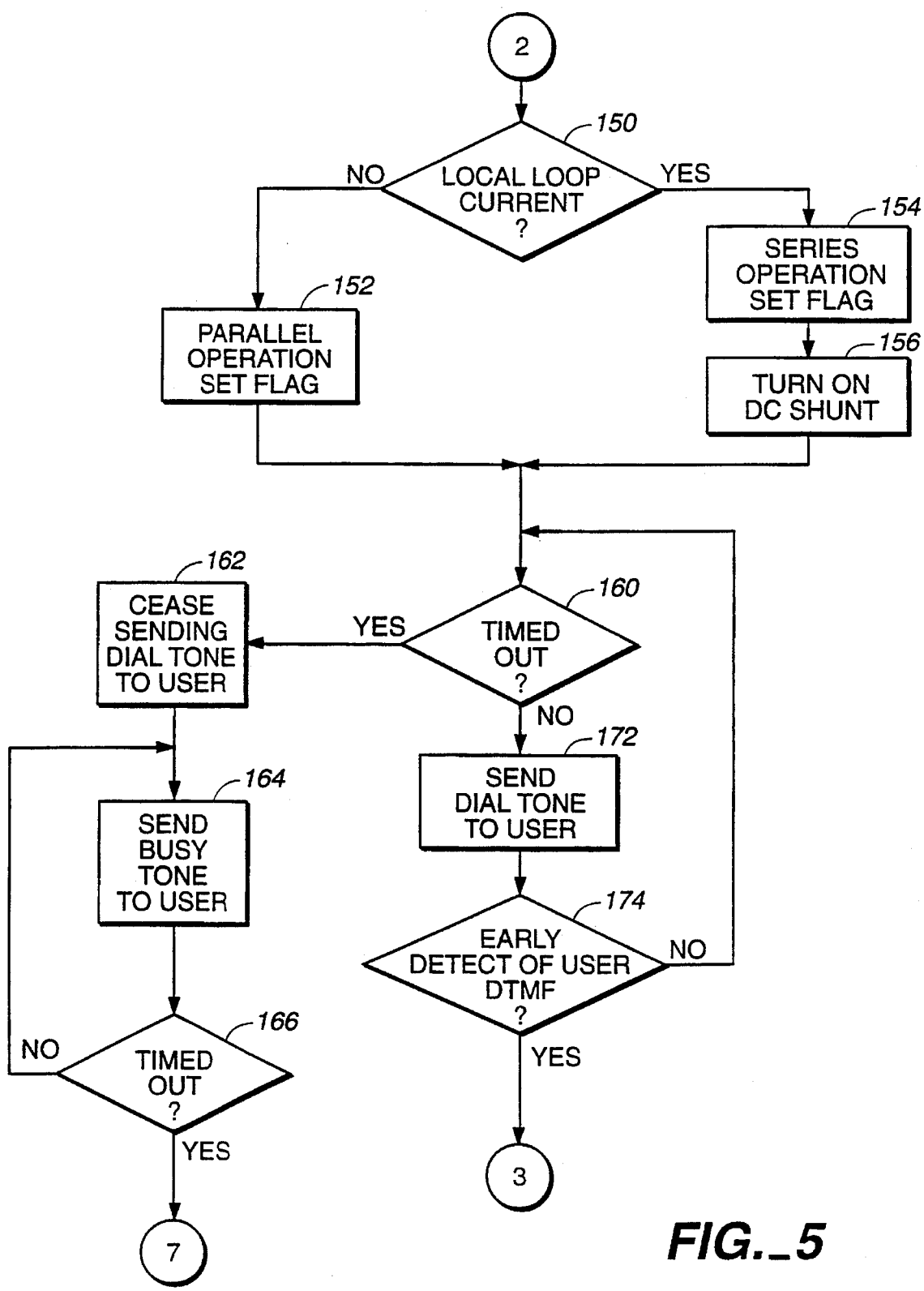
FIG._5

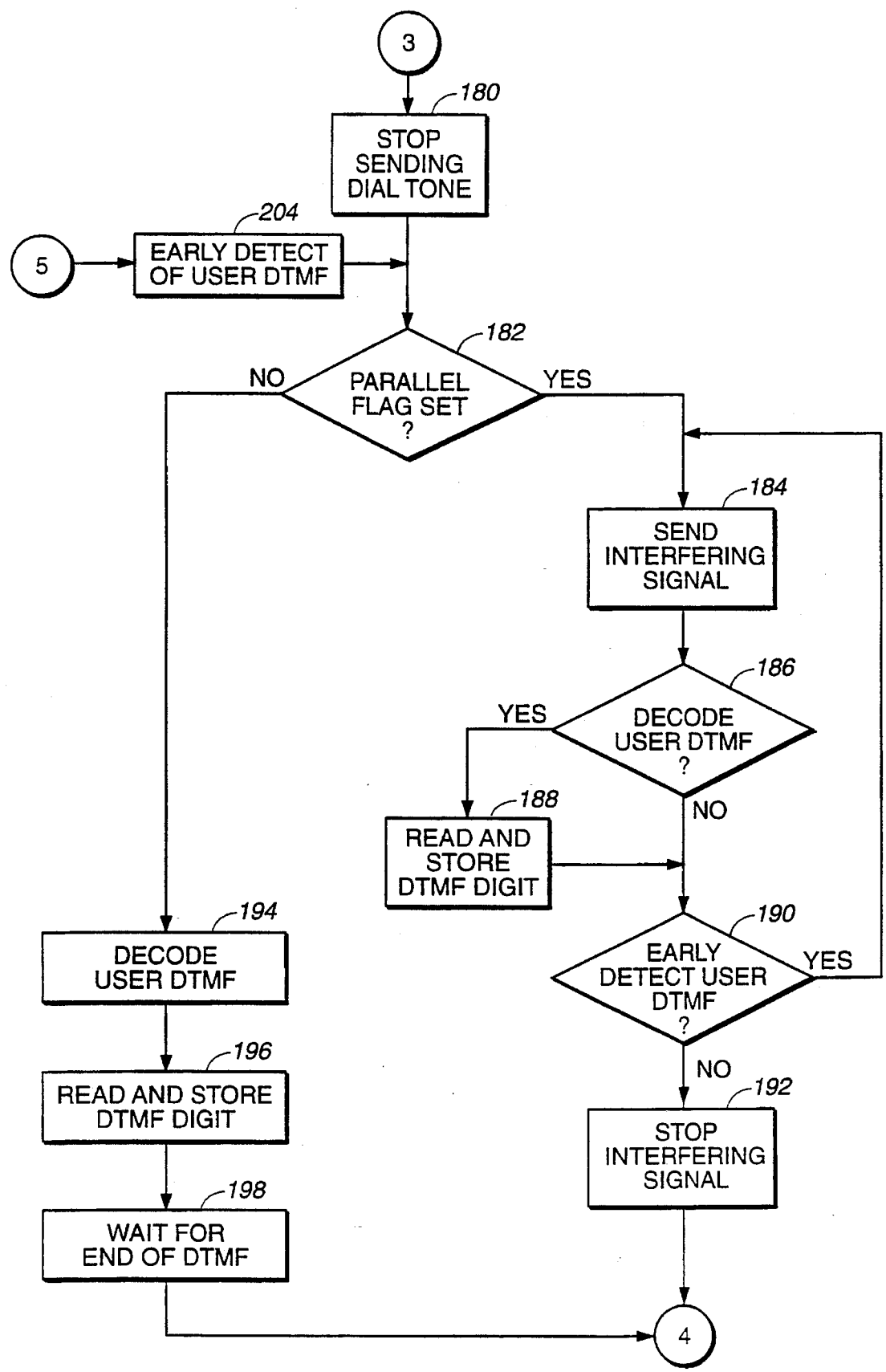
FIG._6

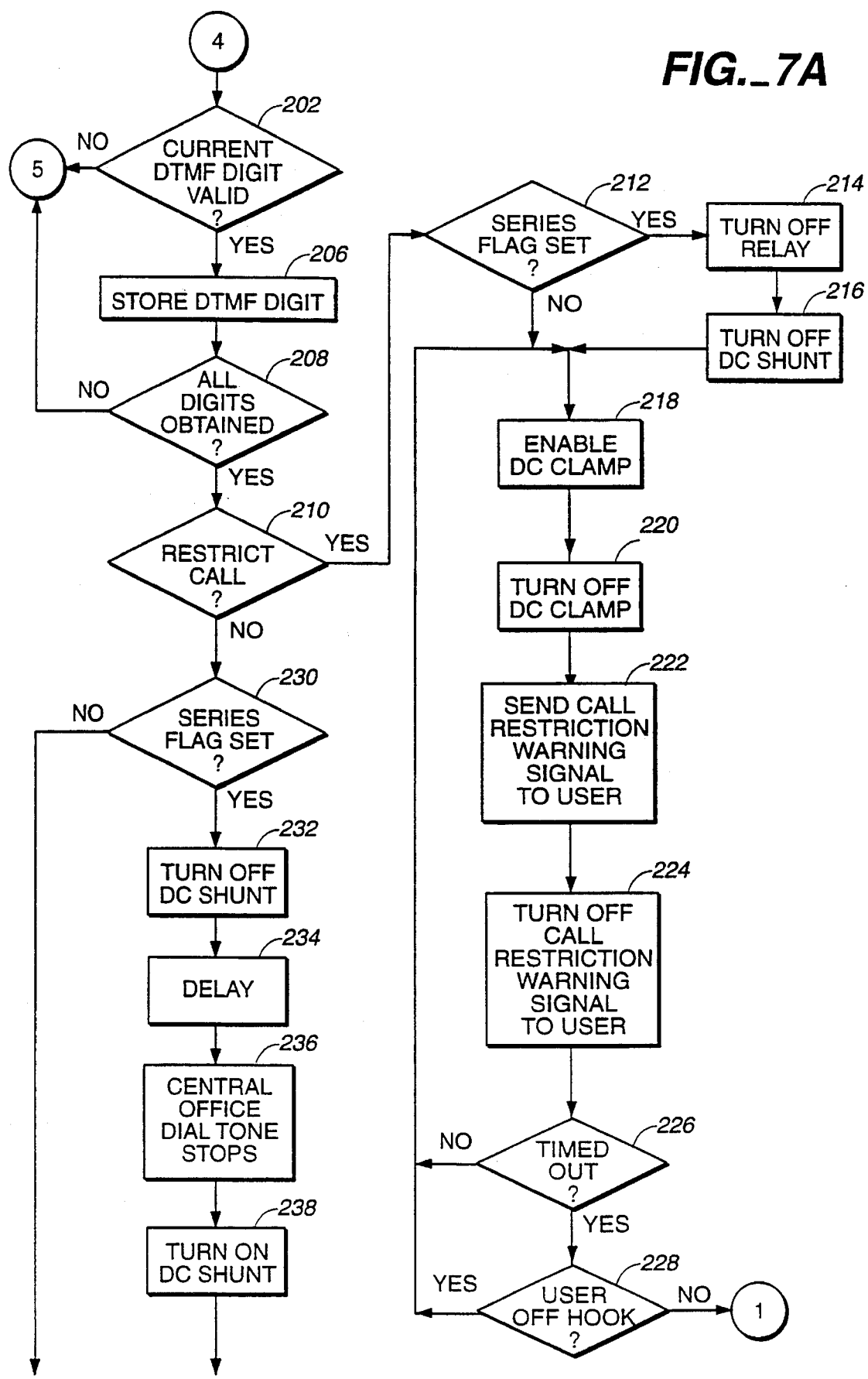
FIG._7A

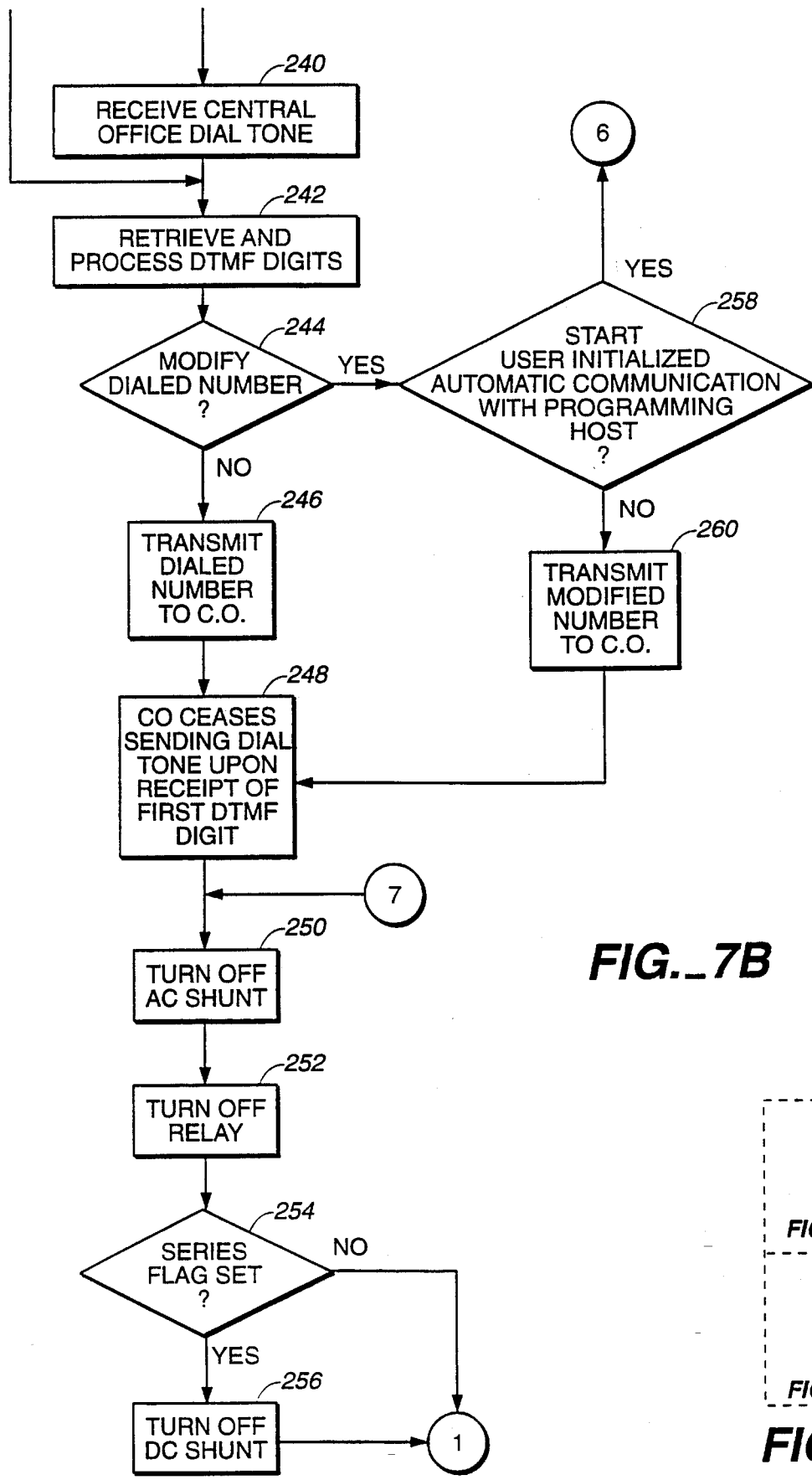
*FIG._7B*
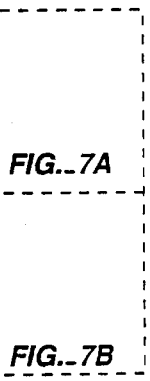
*FIG._7*

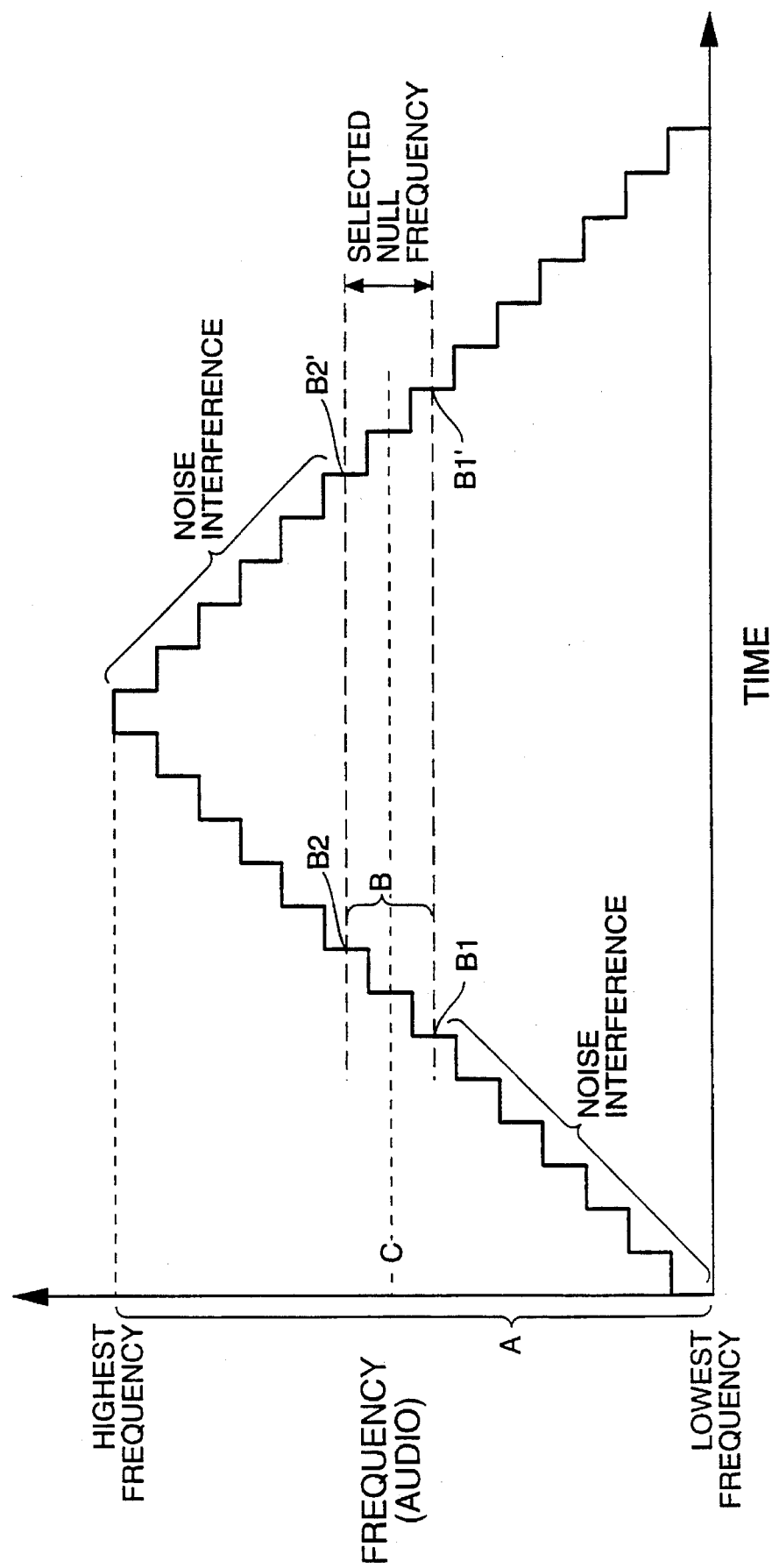
FIG._8

SYSTEM FOR INTERCEPTION AND TRANSMISSION OF COMMUNICATION SIGNALS ON TELEPHONE AND DATA LINES

BACKGROUND OF THE INVENTION

This invention relates in general to telephone accessory systems and, in particular, to a system for interception and transmission of signalling tones on telephone lines.

Telephone calls are charged typically in a three-layered market. In California, for example, telephone calls made are classified into three kinds: local calls, toll calls, and long-distance calls. If the call made by a calling party is made to the called party situated in the same neighborhood or town as the calling party or nearby areas within a few miles, the call is typically a local call. If the called party is located beyond the local calling area of the calling party but within a Local Access and Transport Area (LATA), then the call made is a toll call. Local calls are typically free for residential customers whereas toll calls are charged by the duration of the call. For example, California is divided into eleven LATA's. If the called party is located in a different LATA than that of the calling party even though both parties are in the same state, or if the call is between different states or different countries, then the call is a long-distance call.

The telephone system of this country has undergone tremendous changes since the break-up of the Bell system monopoly. With the court ordered break-up of AT&T, the local telephone company typically retained the monopoly over local calls and toll calls of a particular region of the country whereas long-distance carriers such as AT&T, MCI, Sprint and others would compete for long-distance calls. Recently, however, a number of states have further deregulated the market for toll calls by permitting long-distance carriers to compete with the local telephone companies, so that a telephone user has the option of choosing to use a long-distance carrier as opposed to the local telephone company. Regulators are also considering lifting restrictions on local phone companies so that they can compete in the long-distance call market.

Where both the calling and called parties are located in the same LATA, the call is referred to herein as an intra-LATA call. With the above-mentioned deregulation of the toll call market, consumers can obtain significant cost savings by choosing a long-distance carrier to carry an intra-LATA call as compared to using the local telephone company. For example, California is in the process of adopting a plan to allow long-distance carriers to carry intra-LATA calls. Pacific Bell currently charges $0.97 for a four-minute daytime call between Los Angeles and Anaheim located about twenty-five miles from Los Angeles. The price of this call would drop to $0.56 if competing long-distance carriers are allowed to compete for intra-LATA calls. Competition is expected to further reduce the rate by another 10% or so. See the article, "*The California Phone Rush is On*," The New York Times, Aug. 11, 1993.

Even though in many states, the consumer has the option of choosing a long-distance carrier as opposed to the local telephone company, consumers typically would have to dial a five-digit access code (soon to be seven-digits) as a prefix to the number of the called party in order to charge the call to a competing carrier instead of the local telephone company. If the consumer does not dial the access code, the call would be automatically carried by the local telephone company. Until central office computer software is introduced to facilitate the choosing of different carriers than the default local phone company, most intra-LATA calls are still made through the default carrier, even though choosing a different carrier offers significant cost savings to the consumer. In states like New York where long distance carriers can now compete with Nynex for intra-LATA calls, for example, it is estimated that the local telephone companies have retained about 95% of the residential market.

It is therefore desirable to provide a system that would enable a calling party to automatically choose the lowest cost route for any call that is being made without having to dial an access code as a prefix.

SUMMARY OF THE INVENTION

In order to automatically route a call made by a calling party via the lowest cost carrier, it is desirable to intercept the DTMF (Dual Tone Multi Frequency) codes inputted by a telephone user before such codes reach a central office of the local telephone company, determine whether the call is an intra-LATA call and whether a different carrier should be chosen for routing the call. If a different carrier than the local phone company should be chosen, then an access code is automatically attached as a prefix to the number dialed and the number and its prefix are automatically redialed to the central office of the local telephone company, in order to choose a different carrier than the local telephone company. The current invention intercepts the DTMF codes from the telephone user by a number of techniques. In the preferred embodiments, the present invention jams the DTMF codes by introducing an interfering tone and/or by reducing the amplitude of such codes so that the central office of the local phone company would treat such codes as noise.

One aspect of the invention is directed towards an apparatus for intercepting signals on a telephone line linking a user telephone and a central office and for providing to the telephone line signals representing a message or number. The apparatus is connected to the telephone line in series or in parallel and comprises a low impedance AC shunt connected to the telephone line. The attenuator attenuates the signals on the telephone line so that the amplitude of the signals on the telephone line is below a threshold of the central office, so that the central office does not recognize the signals as representing a telephone number entered by the user. The apparatus further comprises a device transmitting to the central office through the telephone lines signals representing a message or number.

Another aspect of the invention is directed towards an apparatus for intercepting signals on the first telephone line linking a user telephone in the central office, said signals indicating a telephone number, and for providing signals to the telephone line representing said telephone number or a message or number corresponding to said telephone number. The apparatus comprises a generator providing an interference signal to the telephone line so that the central office does not recognize said signals on the telephone line as representing a telephone number entered by the user. The apparatus further comprises a device transmitting to the central office through the telephone line substitute signalling tones When a telephone control device such as a telephone redialer is connected to a telephone, it is important to distinguish as to whether the control device is connected to the telephone line leading to the central office in series or in parallel with the telephone. Another aspect of the invention is directed towards an apparatus for detecting a series or parallel connection between a telephone and control device to a central office. The apparatus comprises a first port for connection with a telephone line connected to a central office, wherein said line is adapted for connection to a telephone to form connection between such telephone to the central office in parallel to the apparatus. The apparatus further comprises a second port for connection to a user telephone instrument, a DC power loop supply, a first telephone "off-hook" sensor, and a switch for rapidly connecting the second port to the first port and connecting the second port to the DC power loop supply and a second off-hook sensor. The apparatus further comprises a controller causing the switch to connect the DC power loop supply and the second off-hook sensor to the second port for testing "off-hook" condition of any telephone connected to the second port thereby distinguishing whether the apparatus is in series or parallel with the active telephone instrument.

For user telephone instruments at a geographical location, there is a set of intra-LATA telephone numbers and lowest toll charge routing codes for such numbers. It will be appreciated that user telephone instruments at different geographical locations will have different sets of intra-LATA telephone numbers and lowest toll charge routing codes. Therefore, in order for the process for automatically routing a call through the lowest toll charge route to occur in a manner transparent to the telephone user, it is necessary to first store the set of intra-LATA telephone numbers and lowest toll charge routing codes for such numbers in a telephone redialing device connected to such telephone at the particular geographical location. Then when a user dials a telephone number indicating an intra-LATA call, the redialing device would then be able to automatically route the call through the lowest cost route. Since user telephone instruments at different geographical locations will have different sets of such numbers and codes, it will be appreciated that user telephone instruments at different geographical locations will have to be programmed using different sets of such numbers and codes. Therefore, another aspect of the invention is directed towards a method for programming a telephone redialing device for a user telephone instrument, said device including a storage. The method comprises providing sets of intra-LATA telephone numbers and lowest toll charge routing codes for such numbers, if any, each set suitable for and corresponding to user telephone instruments at one of a plurality of different geographical locations. The method also includes fetching one of the sets in response to a call through a telephone line from a user telephone instrument in a particular geographical location, said one of the sets fetched corresponding to user telephone instruments at said particular geographical location, said user telephone instruments in the particular geographical location connected to said device including a storage. The method also includes loading through said telephone line into the storage of said device, said fetched set of intra-LATA telephone numbers and lowest toll charge routing codes for such numbers, if any.

BRIEF DESCRIPTION OF THE DRAWINGS

FIG. 1 is a block diagram of a telephone system where a control device is connected in parallel and in series with two telephone instruments to a local telephone company central office to illustrate the invention.

FIG. 2 is a block diagram illustrating in more detail the telephone system of FIG. 1.

FIG. 3 is a block diagram illustrating a system for programming the control device of FIG. 1.

FIGS. 4–7 form a flow chart illustrating the operation of the telephone system of FIGS. 1–3.

FIG. 8 is a graphical illustration of stepped-ramp frequencies in a selected audio band of an interfering tone transmitted by a waveform generator in order to test the most effective frequency for intercepting the DTMF signalling tone from an on-line telephone instrument to illustrate the preferred embodiment of the invention.

DETAILED DESCRIPTION OF THE PREFERRED EMBODIMENT

As shown in FIG. 1, control device 1 is connected to the local telephone company central office 39 through a telephone line 37 comprising tip and ring wires 37a, 37b, in series with telephone 47 and in parallel to phone 35 which is connected to the central office 39 through a pair of wires 2 which are connected to the telephone line 37 as shown. Telephone line 37 is representative of the common subscriber loop or trunk which may normally comprise a fiber, coaxial cable, or wireless link. Control device 1 can be used to control and route telephone calls initiated by both telephones 35 and 47 and directed to the central office 39. Control device 1 has the advantage that, irrespective of how it is connected to the telephone circuit, it can be used to control and route telephone calls initiated from telephone instruments in the same system irrespective of whether such phones are connected in series or in parallel to the control device 1. Such feature of the invention is particularly advantageous since the telephone user need not connect the telephone device in a particular way to the telephone system. In particular, the ability to control and route telephone calls made from a telephone connected in parallel with a control device to the central office renders the control device much more flexible and less likely to be tampered with, if such is a concern of the user. Moreover, a single control device connected in parallel will control and route signals from and to all the telephone devices connected to the telephone line.

The local central office 39 detects DTMF codes present on telephone line 37 in order to switch and direct the call to the proper called party. Since noise is inevitably present on telephone lines such as 37, the central office usually employs one or more DTMF detection filters to filter out all tones except within certain passbands corresponding to the frequencies of the DTMF codes. If the amplitude of a filtered signal present on line 37 is below a certain threshold after the signal is filtered by the bandpass filters at the central office, the central office will regard such signal as noise and will not recognize such signal as a legitimate telephone number dialed. One aspect of the invention is directed to the recognition that, by reducing the amplitudes of the DTMF codes entered by a user of a telephone connected either in series or in parallel with the control device 1 to the central office, it is possible to prevent the central office from recognizing such codes as a legitimate telephone number of the called party. In this manner, the control device is able to control and route the telephone call in a desired manner to take advantage of different routing possibilities permitted through the central office 39. This can be accomplished even though the call is initiated from a telephone 35 connected in parallel to control device 1 to the central office.

FIG. 2 is a schematic block diagram of the telephone system of FIG. 1 showing in more detail the construction of control device 1. For simplicity, identical components are labeled by the same numerals in the figures of this application. As indicated above, control device 1 performs a number of functions. It can be used to intercept the DTMF codes sent by a telephone connected in series or parallel to device 1, to process such codes, and to determine and send a set of appropriate codes or messages to the central office without otherwise disrupting the operation of the telephone system. In particular, even though the telephone user did not input the access code in order to select a lower cost carrier for routing the particular telephone number that is entered, control device 1 is capable of adding the appropriate access code as a prefix to such number so that the central office 39 is instructed nevertheless to route the call through such lower cost carrier than the default carrier otherwise designated for the user's line at the central office. It is, of course, also possible to restrict the telephone numbers reachable by telephones such as 35 and 47 to certain predetermined ones contained in data storage means 5.

Control device 1 is capable of rapidly detecting whether a particular telephone instrument taken "off-hook" in a telephone system such as that shown in FIG. 2 is connected in parallel or in series with the control device 1 to the central office 39. This is performed by means of DC voltage level detection means 19, DC current talk battery means 23, DC current sensor means 25, and switch means 27 in conjunction with the central processor means 3. The DC voltage level detection means 19 also detects whether any telephone instrument connected to the system is in an "off-hook" condition. Detection means 19 is preferably an analog-to-digital converter or a multi-level voltage comparator circuit. Where detector 19 is an analog-to-digital converter, its digital output is monitored by the central processing unit 3 which then compares the output to a preset number to determine whether any telephone instrument in the system is in the "off-hook" condition. Switch 27 is used to select between connecting a second port 34 on line 45 to telephone instruments 47 to a first port 33 on line 37, and connecting the second port to a DC sensor 25 and DC current talk battery supply 23. It will be noted that, where switch 27 is in the normal solid line position as shown in FIG. 2 connecting the second port to the first port, telephone instruments 47 as well as telephone instruments 35 are connected to telephone line 37 monitored by detector 19, so that the "off-hook" condition detected by detector 19 can be present in any one of the four telephone instruments 35, 47. To further determine whether a telephone connected in series or in parallel is in the "off-hook" condition, the central processing unit 3 turns on a relay (not shown) to cause switch 27 to switch to the dotted line position as shown in FIG. 2 connecting the second port to sensor 25 and battery 23. When this happens, the telephone instruments 47 are disconnected from telephone line 37 but connected to the DC current talk battery supply 23 and DC current sensor 25. If the "off-hook" condition is present in one of the instruments 47 instead of one of the instruments 35, upon the switching of switch 27, detector 19 will no longer detect an "off-hook" condition, whereas sensor 25 will instead detect such "off-hook" condition. The outputs of detector 19 and sensor 25 are monitored by the central processing unit 3 in order to determine whether the "off-hook" condition is present in a telephone connected in series or in parallel to device 1. Sensor 25 senses the presence of current flow to determine whether the telephone instruments 47 are in an "off-hook" condition. Therefore, if instruments 47 are "on-hook" and instruments 35 "off-hook," sensor 25 will sense no current whereas detector 19 will continue to detect the "off-hook" condition of instruments 35. By monitoring the outputs of detector 19 and sensor 25, central processing unit 3 can determine which one of the instruments 35 or 47 is "off-hook." Switch 27 may be an electronic or electromechanical relay.

When DTMF codes are inputted through one of the parallel telephone instruments 35 to line 37, device 1 causes the amplitude of the DTMF codes to be reduced so that the central office 39, after filtering the signals on line 37 DTMF detection filters, may regard such DTMF codes as noise or as below the decoding threshold. This reduction in amplitude is accomplished by means of the AC shunt 13 in FIG. 2. In the preferred embodiment, shunt 13 may include a low impedance (i.e., less than ⅓ the impedance of the telephone device) connected by a switching means within AC shunt 13 across the tip-ring wires of line 37, where the switching means is controlled by central processor 3. Processor 3 causes the AC shunt to line 37 in order to decrease the amplitude of the DTMF codes present on line 37. The length of line 37 may vary considerably depending on the configuration of the telephone system, where the length of the line may affect the amplitudes of the DTMF codes detected by the central office 39. To ensure that the central office does not detect the DTMF codes inputted by one of telephone instruments 35, 47, waveform generator 7 is used to generate an interfering tone on line 37. The interfering tone generated by generator 7 is at a frequency which is within a passband of DTMF receiver filters but not within the valid tone decoding ranges of the DTMF receiver of central office 39, so that such tone will have sufficient amplitude to be detected as noise after passing through the DTMF receiver filters of the central office. The central office will treat the interfering tones outside the DTMF receiver decoding ranges as noise and will simply treat the interfering tone as well as the user instrument generated DTMF codes as noise. Therefore, the central office will not respond to the DTMF codes. Generator 7 may simply be a digital-to-analog converter circuit responsive to a digital input from microprocessor 3 to generate the desired analog waveform. Generator 7 can also generate call progress tones such as a busy tone and other communication signals and dial tones for transmission to the telephone instrument which is in the "off-hook" condition. Device 1 is powered by power supply distribution regulation device 31 which is in turn powered by external DC power supply 42 through connection 41 and external AC main power supply 43.

When one of the series connected telephone instruments 47 is detected by sensor 25 as being "off-hook," device 1 causes the instruments 47 to be disconnected from the central office 39 by means of the switch 27, which is controlled by the central processor 3. Telephone instruments 47 are then disconnected from line 37 and central office 39 and receive electrical power from DC current talk battery loop supply means 23. Processor 3 causes generator 7 to generate a dial tone to one of the instruments 47 that is "off-hook" through hybrid 17 and junction 51. When DTMF codes are inputted through one of the instruments 47 and detected by decoder 9 and processor, generator 7 is caused by processor 3 to cease generating a dial tone and the DTMF codes are decoded by waveform signal and tone decoder receiving means 9 and subsequently inputted to central processor 3. Since the instruments 47 are disconnected from line 37 and the central office, the DTMF codes from the instruments 47 are not detectable by the central office 39.

The set or sets of intra-LATA telephone numbers and lowest toll charge routing codes for such numbers, if any, are stored in data storage and retrieval device 5. The incoming DTMF codes from the "off-hook" telephone instrument are decoded by waveform signal and tone decoder 9 which decodes the received audio signals from line 37 into digital information. Decoder 9 may take the form of digital signal processor; alternatively, a specific kind of decoder circuit may also be implemented. Decoder 9 may also be used to detect telephone ringing voltage. The central processor 3 compares the digital information or data (such as the telephone numbers indicated by the DTMF codes as decoded by decoder 9), and compares such data to that stored in storage 5 in order to determine the best routing for such number. If a carrier is called for that is different from the one designated for the central office 39, central processor 3 will cause generator 7 to generate signals representing DTMF codes for dialing the number indicated by decoder 9 but together with the prefix access codes for selecting such different carrier.

Since the set of intra-LATA telephone numbers and lowest toll charge routing codes for such numbers will be different depending on the geographical locations of the telephone instruments 35, 47, it is necessary to store the correct set of such numbers and codes in the storage 5 depending on the geographical location of instruments 35, 47. This may be implemented using the system of FIG. 3. In reference to FIG. 3, a remote programming system (RPS) 70 has stored therein sets of intra-LATA telephone numbers and lowest toll charge routing codes for such numbers for all of the different geographical locations that are possible, such as in the form of a lookup table. Thus a set of intra-LATA telephone numbers and lowest toll charge routing codes for such numbers may be stored in the table for each combination of the three-digit area code and the three prefix numbers of telephone numbers, these six numbers indicating which LATA an incoming request for programming originates. System 70 is also capable of responding to a request for programming initiated by the central processor 3 of device 1 for exchanging "handshakes" with the processor and for fetching from the lookup table and passing the correct set of intra-LATA telephone numbers and lowest toll charge routing codes for such numbers through remote programming system local line 72, central office 74, telephone network 76, central office 39, line 37 to central processor 3 in device 1 for storage in storage device 5.

The set of such numbers and codes stored in storage device 5 may be changed or updated in a manner described below. Once so programmed, the set of numbers and codes may be fetched by processor 3 for selecting the lowest cost carrier. In addition, other sets of numbers may also be stored in storage 5 for the purpose of restricting access by instruments 35, 47 only to certain telephone numbers or only within certain time periods.

The operation of the system of FIGS. 1–3 will now be described by reference to the flow charts in FIGS. 4–7. In reference to FIG. 4, the central processor 3 first checks to see whether there is any call in progress, meaning that either certain DTMF codes are being detected by waveform signal decoder means 9, or that the instruments 35, 47 are "off-hook" as detected by DC voltage level detection means 19 or current sensor 25. See diamond 100. In almost all circumstances, upon start-up, there will be no such codes, levels or currents detected so that the microprocessor proceeds to diamond 102 to determine whether a telephone instrument in the system is in the "off-hook" condition (diamond 102). This is done upon start-up by means of detector 19 sensing a lower voltage on line 37 than a predetermined threshold. Central processor 3 detects the output of detector 19 to ascertain such condition. If no telephone is in the "off-hook" condition, such as when the system is first installed, central processor 3 may be programmed to automatically initiate a communication program for storing the proper set of intra-LATA telephone numbers and lowest toll charge routing codes for such numbers in storage device 5 (diamond 104). Processor 3 then proceeds to turn on the DC shunt 15 in FIG. 2. DC shunt 15 will simulate the DC load of a telephone instrument so as to block incoming calls. DC shunt 15 may simply be a resistance and an electonic switch or relay which is controlled by processor 3. When enabled, DC shunt 15 applies a resistance across the tip and ring wires of line 37, thereby drawing loop current through line 37 from a central office 39. When the loop current is sensed by the central office, it sends a dial tone (Block 106 in FIG. 4). This allows device 1 to dial a predetermined telephone number to central office 39. Processor 3 then transmits the automatic communication host telephone number to thereby connect device 1 with host 70 through central office 39, telephone network 76 and central office 74. Host 70 also receives subscriber line number identification information through the central office and network; host 70 then fetches the correct set of intra-LATA telephone numbers and the corresponding coded programming from its lookup table according to programming information and sends such programming to device 1 so that the set of numbers and codes may be stored in storage and retrieval means 5. See Blocks 108, 110 and 112. The communications program is then ended and DC shunt 15 is turned off (blocks 114, 116). Processor 3 then returns to diamond 102 to check whether any telephone in the system is "off-hook." If none is detected, the processor simply proceeds to diamond 104 in a loop and back to diamond 102 indefinitely until a telephone is detected to be "off-hook."

The processor then checks to see whether any ringing voltage has been received before an "off-hook" condition is detected (diamond 120). If ringing before an "off-hook" condition is detected by decoder 9, processor 3 then returns to diamond 100 to determine when the call in progress has ended (diamond 100). If the call is still in progress, processor 3 goes to diamond 122 to determine whether a service routine is called for. If a service program is called for, processor 3 simply causes the service to be initiated and carried out as well as tested before returning to diamond 100 (blocks 124, 126, 128, 130).

The remote programming system 70 of FIG. 3 may be a computer with a programming look-up table in a storage and retrieval system. Computer 70 then responds to the communication host number transmitted in block 108 by device 1 by fetching the corresponding set of intra-LATA telephone numbers and lowest toll charge routing codes for such numbers for transmission to device 1 in the manner described above.

If no ringing voltage is detected before the "off-hook" condition in diamond 120, processor 3 causes the switch in AC shunt 13 to be turned on in order to decrease the amplitude of any signals present on line 37 (block 142). A relay means, part of switch 27, is turned on rapidly to cause switch 27 to switch from the solid line to the dotted line position shown in FIG. 2 (block 144). The central office 39 also detects the "off-hook" condition and sends a dial tone onto line 37 (block 146). The dial tone on line 37 from the central office is decreased in amplitude by the AC shunt 13; processor 3 causes generator 7 to generate a dial tone which is supplied to the "off-hook" telephone instrument after it is amplified by amplifier 21, and is passed through telephonic hybrid 17 to line 37. At this point it should be noted that both device 1 and central office 39 are simultaneously sending dial tones to line 37, but the dial tone of device 1 is higher in amplitude.

In reference to FIG. 5, the microprocessor then proceeds to determine whether the telephone that is in the "off-hook"

condition is connected in parallel or series with device 1 to line 37 (diamond 150). As indicated above, this is performed by processor 3 monitoring the outputs of detector 19 and sensor 25. A parallel operation or series operation flag is set (blocks 152, 154). In the event that series operation is detected, the DC shunt 15 is also switched on to block all incoming calls in a manner described above (block 156).

Processor 3 then sets a timer within processor 3 for detecting DTMF codes inputted by a telephone user via the "off-hook" telephone and determines whether such time has run out (diamond 160).

If time has run out, processor 3 would cause generator 7 to stop sending a dial tone to the user (block 162) and sends a busy call progress signal instead (block 164). Processor 3 then sets a timer within processor 3 for determining whether the busy signal has timed out (diamond 166). If the busy signal has not timed out, processor 3 simply returns to block 164 to continue sending the busy signal. If the busy signal has timed out, central processor 3 then proceeds to item 7 in FIG. 7 to be described below. If in diamond 160, the timer set by processor 3 has not timed out, processor 3 will cause the waveform generator to continue sending a dial tone to the user (block 172) and processor 3 monitors the output of waveform detector decoder 9 to determine the early detection of the user telephone instrument DTMF codes in diamond 174. Early detection is the immediate detection of the presence of signal characteristics prior to decoding the value or validity of the signal. If no such codes are detected, processor 3 simply returns to diamond 160 to continue sending the dial tone and to detect the DTMF codes. If such codes are detected, the processor proceeds to item 3 in FIG. 6.

In reference to FIG. 6, when the first user DTMF code is detected by decoder 9, processor 3 causes generator 7 to stop sending a dial tone (block 180). At this time the central office can still be sending a dial tone. Processor 3 then checks to see whether the parallel flag has been set (diamond 182). If it indicates a parallel operation (i.e., the DTMF code is coming from one of the telephone instruments 35 connected in parallel with device 1 to the central office via line 37), the central processor 3 causes generator 7 to generate an interfering signal (block 184) and decodes the user DTMF code. If the code can be decoded by decoder 9, the decoded digit is read and stored along with a flag (diamond 186, block 188) which indicates that a valid DTMF digit has been decoded. If the code cannot be decoded, no flag is set and the processor proceeds to diamond 190 to continue early detection of user DTMF codes. If such code is again detected, processor 3 returns to block 184. If no such code is detected, processor 3 causes generator 7 to stop generating an interfering signal and proceeds to item 4 in FIG. 7. If instead of operating in the parallel mode, the DTMF code originates from a series connected telephone instrument in reference to diamond 182, processor 3 then proceeds to decode the DTMF code, read and store the decoder digit and wait for the end of the DTMF tone before proceeding to item 4 (blocks 194, 196, 198).

In reference to FIG. 7, processor 3 then checks to see whether the current DTMF digit that is decoded is valid by checking the condition of the flag set in block 188 (diamond 202). If not valid, the processor proceeds to item 5 in FIG. 6 and early detection of user DTMF codes in block 204. If the current DTMF digit decoded is valid, such DTMF digit is stored (block 206) and processor 3 then checks to see if all digits for a telephone number have been obtained (diamond 208). If not all digits have been obtained, processor 3 returns to block 204. If all digits for a valid telephone number have been obtained, processor 3 proceeds to check to see whether the telephone number inputted by the user instrument indicates a call that is restricted (diamond 210). As indicated above, it is possible to store permitted and forbidden telephone numbers in storage 5 for comparison with the telephone number inputted by the user instrument to determine whether the called number is a restricted one. If processor 3 determines that the call is restricted, then it proceeds to check the series flag to determine whether the restricted number was dialed from instruments 35 or instruments 47 (block 212). If the series flag is set, indicating that the restricted call was made from instruments 47, processor 3 proceeds to turn off the relay for switch 27 and the DC shunt (blocks 214 and 216) and proceeds to block 218. Turning off the relay for switch 27 has the effect of re-connecting the instruments 47 to line 37 and disconnecting them from the battery 23 and sensor 25. If the series mode flag is not set, indicating that the restricted call was made from instruments 35, or after the relay for switch 27 and the DC shunt have been turned off if the series flag is set, processor 3 proceeds to set a timer within processor 3 for determining the length of time to send out the call restrictor warning signal. Processor 3 then proceeds to enable the DC clamp 57 (block 218) in FIG. 2 for a predetermined period of time to short out the telephone line 37 causing the DC voltage across the line 37 to drop to close to 0 VDC which renders telephone instruments 35 and 47 inoperable and further prevents any voice communications from instruments 35 and 47 or any additional DTMF codes from being inputted by instruments 35 and 47 and detected by the central office 39.

When the predetermined period of time is over, processor 3 then turns off DC clamp 57 (block 220) and begins sending a call restriction warning signal for a predetermined period of time (block 222) which alerts the user that the dialed number is being restricted. When the predetermined time period is over (block 224), processor 3 then determines if the length of time to send out the call restriction warning signal has run out (block 226). If time has not run out, processor 3 simply returns to block 218 to continue to DC clamp line 37 and send the call restriction warning signal. If time has run out, processor 3 determines if any telephone instruments 35 or 47 are still in the "off-hook" condition by checking the condition of detector 19 (block 228). If the "off-hook" condition is still present in any of the instruments 35 or 47, processor 3 simply returns to block 218 to continue to DC clamp line 37 and send out the call restriction warning signal. If the "off-hook" condition is not present on any of the instruments 35 or 47, processor 3 returns to the beginning of the program in FIG. 4 as described above.

If the telephone number decoded is not a restricted call in reference to diamond 210, processor 3 proceeds to diamond 230 to check if the series flag has been set. If yes, processor 3 then turns off the DC shunt 15 and, after a certain delay until the central office dial tone stops, turns on the DC shunt 15 again (blocks 232, 234, 236, 238). The reason for performing these steps is to ensure that there is adequate time for redialing before the central office times out. The central office dial tone is then received in block 240 and the stored telephone digits are retrieved and processed for dialing (blocks 240, 242). If the series flag has not been set in reference to diamond 230, this means that the telephone number dialed originated from a telephone connected in parallel to device 1. In such event, processor 3 simply proceeds to block 242 to retrieve and process the DTMF digits for dialing.

Processor 3 then checks the telephone number indicated by the retrieved DTMF digits against the intra-LATA telephone numbers to determine whether the dialed number should be modified to take advantage of lower cost carriers (diamond 244). If the number does not need to be modified upon checking, such dialed number is transmitted to the central office (block 246), so that the central office ceases sending the dial tone upon receipt of the first DTMF digit dialed by the processor (block 248) and the processor proceeds to turn off the AC shunt and the relay of switch 27 (Blocks 250, 252), checking for series flag and turning off DC shunt 15 if the flag is on and returns to the beginning of the program in FIG. 4 as described above.

If the number should be modified upon checking by the processor in diamond 244, then processor 3 checks to see whether a proper set of telephone numbers of corresponding codes has been stored in storage 5 (diamond 258). If such a set of numbers has been stored, processor 3 modifies the dialed number and transmits the modified number to the central office, such as by adding a prefix as an access code for a lower cost carrier (Block 260). If, however, the processor discovers that a proper set of intra-LATA phone numbers and corresponding codes has not been stored in storage 5 in FIG. 2 or otherwise properly updated or if an initialization number has been received processor 3 proceeds to item 6 in FIG. 4 to communicate with the RPS remote programming system 70 in FIG. 3 to initiate the storing of an updated set of intra-LATA phone numbers and corresponding codes in storage 5. In reference to FIGS. 5 and 7, when the busy call progress tones have timed out in diamond 166, processor 3 proceeds to turn off the AC shunt and relay switch 27 in blocks 250, 252 and checks for the series flag in diamond 254 before proceeding to item 1 in FIG. 4.

Device 1 also has several other features that enable the above-described operation. Thus, the early detection of DTMF signals is performed during the first 10 milliseconds of the user's instrument DTMF signal. While the AC shunt 13 attenuates both the dial tone from the central office 39 and the DTMF signals from instruments 35, the dial tones and DTMF signals originating from generator 7 are amplified by amplifier 21 to the appropriate level so that they can be properly received by instruments 35 and central office 39 despite the attenuation of the AC shunt. The signal from the user instrument on line 37 passes through hybrid 17, is amplified by amplifier 29, and filtered by filter 11 to reduce the amplitude of or subtract the interfering signal generated by generator 7 and passes on an amplified signal from the user telephone 35. As used in other telephone circuits, hybrid 17 cancels the signal being transmitted in a receive path to avoid echos and rejects the received signal in the transmit path to avoid echos as well.

After the modified or unmodified dialed number is transmitted by processor 3 to the central office, processor 3 then causes switch 27 to switch back from the dotted line position to the solid line position and turns off the AC shunt resistance means 13. Where the call originates from instruments 47 connected in series with device 1, such switching enables the user instrument to communicate through line 37 through central office 39.

In the parallel operation mode, where the dialed number originates from instruments 35, it is important for the interfering signal originating from generator 7 to be filtered or subtracted completely before the DTMF signal originating from the user instrument reaches decoder 9. This function is performed both by the hybrid 17 which rejects the transmitted signal from generator 7 in the return path from line 37 to amplifier 29. This function is enhanced by filter 11 which is a rejection filter with its characteristic frequency at the frequency of the interfering tone from generator 7. Since accurate filters with precise characteristic frequencies are expensive, it may be desirable to provide for a method where cheaper filters can still be used to lower the cost of device 1. This can be performed by checking the passband of filter 11 and adjusting the frequency of the interfering tone to be as close as possible to the characteristic frequency of filter 11. This may be performed by causing generator 7 to generate a sequence of interfering tones with increasing frequencies, where the frequencies increase by steps indicated in FIG. 8. The frequencies of the interfering tone generated by generator 7 steps through a range A shown in FIG. 8, where the range covers the possible rejection range of the filter. At the same time, instruments 35 are used to generate proper DTMF signals such as those indicating the number 2 or 3 as dialed. Decoder 9 is then used to decode the DTMF signals received through line 37, hybrid 17, amplifier 29, and rejection filter 11. The DTMF signals should be entirely masked by the interfering signal until the frequency of the interfering tone is within the range B in FIG. 8 corresponding to the rejection range of the filter. Therefore, when the frequencies of the interfering tone are stepping up, processor 3 will detect when the proper DTMF signal first becomes unmasked at point B1 and becomes masked again at point B2. Corresponding points B1' and B2' may be determined by the processor upon stepping down of the frequency of the interfering signal. In this manner, the characteristic falling and rising edges of filter 11 may be determined so that the interfering tone frequency may be set at the midpoint of range B such as at frequency C. In this manner, inexpensive notch filters 11 may be used without degrading the performance of the system. In some embodiments, the interfering tone has a frequency of 1715 Hertz. It is discovered that this value may be varied within 3% (i.e., about 50 Hz ) without severely degrading the performance of the system.

while the invention has been described by reference to various embodiments, it will be understood that various changes and modifications may be made without departing from the scope of the invention which is to be limited only by the appended claims. For example, the system may also be applicable to pulse dialing telephone systems as well as DTMF systems.

What is claimed is:

1. An apparatus for intercepting a signal carried on a telephone line that links a signal transmitter to a signal receiver, the signal receiver having signal detection filters with predetermined passbands and having valid signal decoder ranges, the apparatus comprising:

a waveform generating means for producing an interfering signal having a component frequency that is inside the passbands of the signal detection filters but outside the valid signal decoder ranges, so that a substantial portion of the interfering signal passes through at least one of the filters and has an amplitude above a predetermined noise threshold; and a coupling means for introducing the interfering signal into the telephone line while the signal is carried on the line;

whereby the portion of the interfering signal which passes through one of the filters is interpreted by the signal receiver as noise, and causes the signal to be not recognized by the signal receiver.

2. The apparatus of claim 1 wherein the signal is a DTMF signal.

3. The apparatus of claim 1 wherein the signal transmitter is a device selected from the group consisting of a telephone, a fax machine, a central office, a PBX switch and a modem, switching equipment of a public switched network, and a central office.

4. The apparatus of claim 1 wherein the signal receiver is a device chosen from the group consisting of a telephone, a fax machine, a modem, a PBX switch, switching equipment of a public switched network, and a central office.

5. The apparatus of claim 1 wherein the signal decoder ranges comprise the DTMF frequencies 697 Hz, 770 Hz, 852 Hz, 941 Hz, 1209 Hz, 1336 Hz, 1447 Hz and 1633 Hz.

6. The apparatus of claim 1 wherein the component frequency of the interfering signal is in the interval of approximately 1650 Hz to 2300 Hz.

7. The apparatus of claim 1 wherein the signal transmitter is connected to the telephone line at a first line outlet and wherein the apparatus is connected to the telephone line at a second line outlet in parallel with the first line outlet, i.e., such that if the apparatus is disconnected from the telephone line then the transmitter is not thereby disconnected.

8. The apparatus of claim 7 wherein the first line outlet and second line outlet are wired connections.

9. The apparatus of claim 1 wherein the signal transmitter is connected to the telephone line in series with the apparatus, i.e., such that if the apparatus is disconnected from the telephone line then the transmitter is also disconnected.

10. The apparatus of claim 1 wherein the signal receiver is connected to the telephone line at a first line outlet and wherein the apparatus is connected to the telephone line at a second line outlet in parallel with the first line outlet, i.e., such that if the apparatus is disconnected from the telephone line then the receiver is not thereby disconnected.

11. The apparatus of claim 10 wherein the first line outlet and second line outlet are wired connections.

12. The apparatus of claim 1 wherein the signal receiver is connected to the telephone line in series with the apparatus, i.e., such that if the apparatus is disconnected from the telephone line then the receiver is also disconnected.

13. The apparatus of claim 1 further comprising an AC shunting means for decreasing the amplitude of the signal, the AC shunting means having an impedance lower than an impedance of the signal transmitter.

14. The apparatus of claim 13 wherein the AC shunting means has an impedance less than the characteristic impedance of the signal transmitter.

15. The apparatus of claim 13 wherein the AC shunting means is connected in parallel with the waveform generating means and wherein the waveform generating means also has an impedance lower than the impedance of the signal transmitter.

16. The apparatus of claim 1 further comprising:

a telephonic hybrid means connected in parallel to the telephone line for extracting the signal from the telephone line by rejecting the interfering signal, the hybrid means having a low telephone line impedance; and a decoder means for determining the signal.

17. The apparatus of claim 16 further comprising a filtering means for further rejecting the interfering signal.

18. The apparatus of claim 1 further comprising:

a filtering means for rejecting the interfering signal; and a decoder means for determining the signal.

19. The apparatus of claim 1 wherein the waveform generating means produces a substitute signal chosen from the group consisting of a DTMF tone, a dial tone, a busy signal and call progress signals.

20. The apparatus of claim 19 wherein the waveform generating means produces a DTMF tone corresponding to a substitute telephone number that preferrentially selects a carrier.

21. The apparatus of claim 20 further comprising a microprocessor for selecting the substitute telephone number.

22. The apparatus of claim 20 wherein the carrier is selected to be a least cost carrier.

23. The apparatus of claim 20 wherein the carrier is selected to be a dedicated predetermined carrier.

24. The apparatus of claim 20 further comprising a database for selecting the substitute telephone number.

25. The apparatus of claim 24 wherein the database is remotely programmed via an exchange of data over the telephone line.

26. The apparatus of claim 1 further comprising a processing means that is remotely programmed over the telephone line automatically.

27. The apparatus of claim 1 wherein the telephone line comprises a connecting means chosen from the group consisting of a coaxial cable, a fiber, a tip-and-ring metalic pair, and a wireless link.

28. The apparatus of claim 1 wherein the waveform generating means comprises a digital signal processor.

29. The apparatus of claim 1 further comprising a digital signal processing means for extracting the signal from the telephone line by rejecting the interfering signal.

30. The apparatus of claim 1 further comprising an early detection means for detecting the presence of the signal within 10 milliseconds of its initiation.

31. The apparatus of claim 1 further comprising a processing means that is programmable via an exchange of data over the telephone line, wherein the apparatus automatically initiates the exchange and wherein the data comprises absolute lowest cost carrier data used to control the routing of telephone calls by the apparatus.

32. The apparatus of claim 1 wherein the interferring signal is selectively transmitted only during the period of time when required for jamming the signal.

33. An apparatus for intercepting a signal on a telephone line connecting a first telephone device having a first impedance and a second telephone device having a second impedance, the apparatus comprising:

an AC shunting means for decreasing the amplitude of the signal, the AC shunting means being connected to the telephone line in parallel and having an AC shunt impedance smaller than the first impedance and smaller than the second impedance;

a signal generating means for transmitting onto the telephone line an interfering signal, the signal generating means being connected to the telephone line in parallel and having a generator impedance smaller than the first impedance and smaller than the second impedance; the interfering signal having a component frequency that is inside the passbands of signal detection filters in the second telephone device, so that a substantial portion of the interfering signal passes through at least one of the filters and has an amplitude above a predetermined noise threshold;

a signal receiver means for receiving and decoding the signal on the telephone line while the signal generating means is transmitting the interfering signal, the signal receiver means being connected to the telephone line in parallel;

whereby the signal on the telephone line will be decreased in amplitude and jammed, while being decoded by the apparatus.

34. The apparatus of claim 33 wherein the signal is a signal selected from the group consisting of a DTMF signal, call progress signals, a dial tone, and a busy signal.

35. The apparatus of claim 33 wherein the first telephone device is a device chosen from the group consisting of a telephone, a modem, a fax machine, a PBX switch, a public switched network and a central office.

36. The apparatus of claim 33 wherein the second telephone device is a device chosen from the group consisting of a central office, a PBX switch, a public switched network, a telephone, a modem, and a fax machine.

37. The apparatus of claim 33 wherein the signal generating means further functions to transmit onto the telephone line a signal chosen from the group consisting of a DTMF signal, call progress signals, a dial tone, and a busy signal.

38. The apparatus of claim 33 further comprising an early detection means for detecting the presence of the signal within 10 milliseconds of its initiation.

39. The apparatus of claim 33 wherein the signal receiver means comprises a telephone hybrid and a signal decoder.

40. The apparatus of claim 33 wherein the signal receiver means comprises a rejection filter and a signal decoder.

41. The apparatus of claim 33 wherein the signal receiver means comprises a telephone hybrid, a rejection filter, and a signal decoder.

42. The apparatus of claim 33 wherein the component frequency of the interfering signal is outside a valid signal decoder range of the second telephone device.

43. The apparatus of claim 33 wherein the signal generating means comprises a digital signal processor.

44. The apparatus of claim 33 wherein the signal receiver means comprises a digital signal processor.

45. The apparatus of claim 33 further comprising a processing means that is programmable via an exchange of data over the telephone line.

46. The apparatus of claim 45 wherein the processing means is programmed to direct calls to an absolute lowest cost carrier.

47. The apparatus of claim 46 wherein the processing means is programmed to direct calls to a dedicated predetermined carrier.

48. The apparatus of claim 33 further comprising a processing means that is remotely programmed over the telephone line automatically.

49. The apparatus of claim 33 further comprising a processing means that is programmable via an exchange of data over the telephone line, wherein the apparatus automatically initiates the exchange and wherein the data comprises absolute lowest cost carrier data used to control the routing of telephone calls by the apparatus.

50. The apparatus of claim 33 wherein the interferring signal is selectively transmitted only during the period of time when required for jamming the signal.

51. An apparatus for simultaneously lowering the amplitude of a signal generated by a telephone device on a telephone line, receiving the signal, and generating a substitute signal, the apparatus comprising:

an AC shunt connected in parallel to the telephone line and having an impedance less than the impedance of the telephone device;

a signal generating means for generating a substitute signal, the signal generating means being connected in parallel to the telephone line and having an impedance matched to the impedance of the AC shunt;

an telephone hybrid connected in parallel to the telephone line and having a line impedance matched to the impedance of the AC shunt; and a receiver means connected to the telephone hybrid for receiving the signal.

52. The apparatus of claim 51 wherein the signal is a dial tone and the telephone device is a device selected from the group consisting of a central office, a PBX switch, and a public switched network.

53. The apparatus of claim 51 wherein the substitute signal is a dial tone and the telephone device is a device selected from the group consisting of a central office, a PBX switch, and a public switched network.

54. The apparatus of claim 51 further comprising a processing means that is programmable via an exchange of data over the telephone line.

55. The apparatus of claim 54 wherein the processing means is programmed to direct calls to an absolute lowest cost carrier.

56. The apparatus of claim 54 wherein the processing means is programmed to direct calls to a dedicated predetermined carrier.

57. The apparatus of claim 54 wherein the apparatus automatically initiates the exchange of data over the telephone line.

58. The apparatus of claim 51 further comprising a processing means that is programmable via an exchange of data over the telephone line, wherein the apparatus automatically initiates the exchange and wherein the data comprises absolute lowest cost carrier data used to control the routing of telephone calls by the apparatus.

59. The apparatus of claim 51 wherein the substitute signal is selectively transmitted only during the period of time when required for lowering the amplitude of the signal.

60. A method for simultaneously decoding and inhibiting DTMF signals on a telephone line, where the source of the DTMF signals is in parallel with an electronic circuit apparatus, the method comprising:

inhibiting the detection of the DTMF signals by any DTMF receiver connected to the telephone line in parallel by the use of the electronic circuit apparatus, where the electronic circuit apparatus is connected in parallel with the telephone line; and decoding the DTMF signals on the telephone line with the electric circuit apparatus.

* * * * *